United States Patent [19]

Schwartz

[11] 3,777,881

[45] Dec. 11, 1973

[54] TAPE CASSETTE HOLDER

[76] Inventor: Louis E. Schwartz, 57 Worth St., New York, N.Y. 10013

[22] Filed: Sept. 1, 1971

[21] Appl. No.: 177,001

[52] U.S. Cl. .......... 206/1 R, 206/52 F, 206/DIG. 36

[51] Int. Cl. .......................... B65d 1/34, B65d 85/67

[58] Field of Search ............ 206/1 R, 45.31, 46 FC, 206/52 A, 52 F, DIG. 5, DIG. 24, DIG. 32, DIG. 36; 220/31 S

[56] References Cited

UNITED STATES PATENTS

| | | | |
|---|---|---|---|
| 3,603,478 | 9/1971 | Connan | 220/31 S UX |
| 3,620,367 | 11/1971 | Stembel | 206/DIG. 36 |
| 3,583,729 | 9/1971 | DeGroot | 206/DIG. 36 |

*Primary Examiner*—William T. Dixson, Jr.
*Assistant Examiner*—Steven E. Lipman
*Attorney*—Albert F. Kronman

[57] ABSTRACT

A container for a plurality of audio tape cassettes is disclosed in which a plurality of tape cassette receiving recesses together with resilient cassette retaining members are formed of one or two sheets of plastic material.

7 Claims, 15 Drawing Figures

INVENTOR.
LOUIS E. SCHWARTZ
BY [signature]
ATTORNEY

INVENTOR.
LOUIS E. SCHWARTZ
BY [signature]
ATTORNEY

FIG. 11
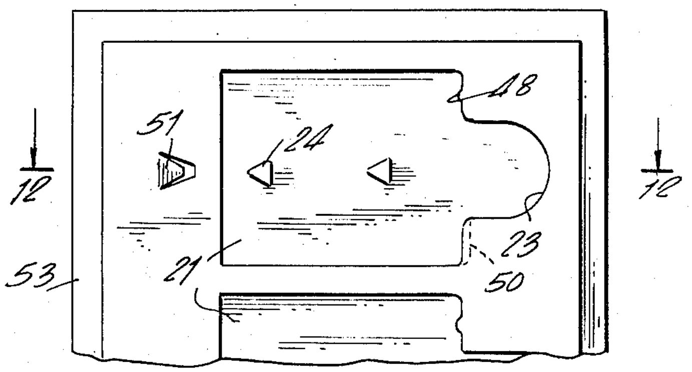
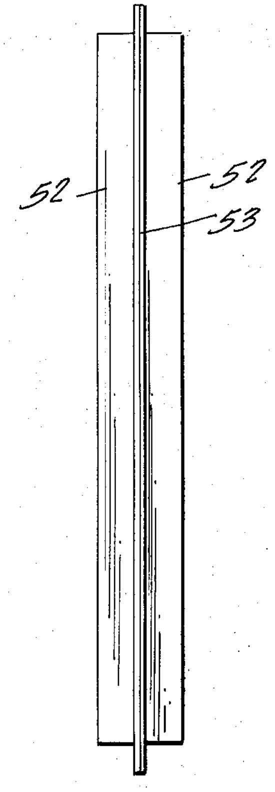
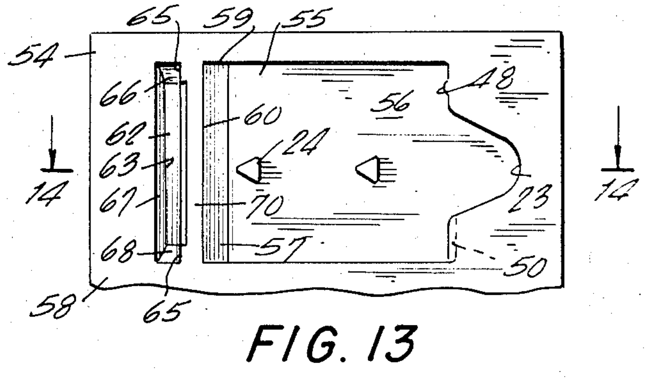
FIG. 13
FIG. 10
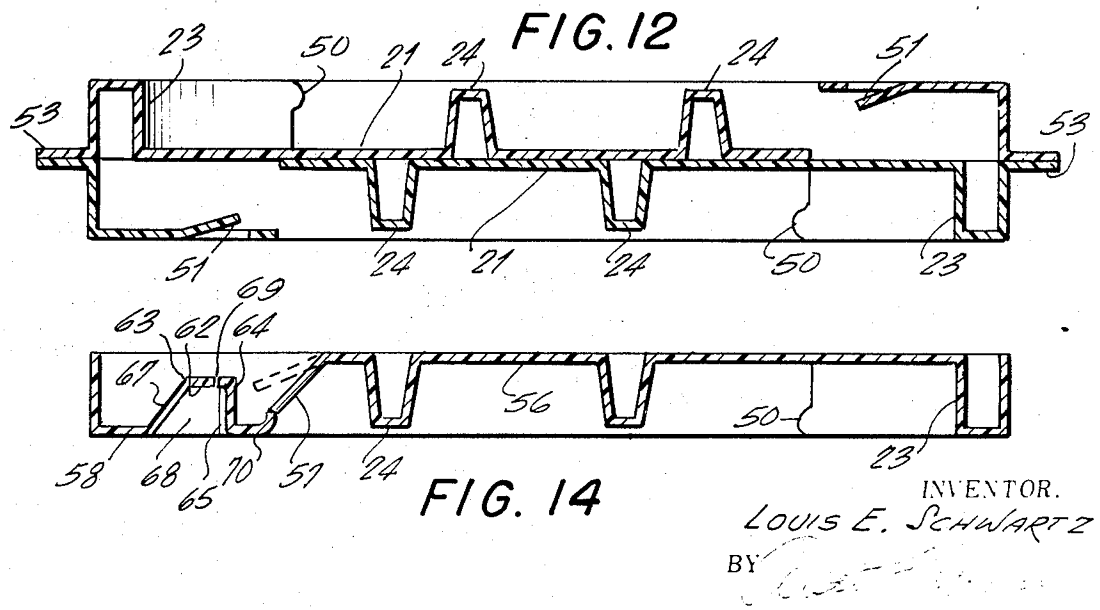
FIG. 12, FIG. 14
INVENTOR.
LOUIS E. SCHWARTZ
BY
ATTORNEY

TAPE CASSETTE HOLDER

BACKGROUND OF THE DISCLOSURE

Containers for a plurality of audio tape cassettes have been disclosed in United States Letters Pat. Nos. 3,503,141 and D 219,760 issued Mar. 31, 1970 and Jan. 1, 1971 both issued to Louis Schwartz. These patented containers, however, were made of a plurality of parts secured together and requiring a substantial amount of assembly time.

Accordingly it is an object of the present invention to provide an audio tape cassette holder formed of one or two sheets of plastic material.

Another object of the present invention is to provide an audio tape cassette holder in which the resilient cassette retaining members are struck from the sheet of plastic material.

Still another object of the present invention is to provide an audio tape cassette holder which may be combined with similar holders to form an album.

SUMMARY OF THE INVENTION

In one embodiment of the present invention a sheet of plastic material having an inherent resiliency such as nylon, methyl methacrylate, styrene, or the like is vacuum or otherwise formed with a plurality of cassette receiving recesses. Tape reel receiving members are formed in each recess and spring leaves which hold the cassettes securely within the recesses are struck from the plastic to bear against one end of the cassette. Another embodiment employs a tray-like sheet overlying the first formed sheet.

DESCRIPTION OF THE DRAWINGS

In the accompanying drawings forming part hereof similar parts have been given the same reference numerals, in which drawings:

FIG. 10 is a side view of a cassette holder made up of two formed sheets secured in back to back relationship.

FIG. 11 is a fragmentary view in front elevation, somewhat enlarged, of the holder shown in FIG. 10.

FIG. 12 is a cross-sectional view taken on line 12—12 in FIG. 11.

FIG. 13 is a fragmentary view in front elevation of a further embodiment of the present invention.

FIG. 14 is a cross-sectional view taken on line 14—14 in FIG. 13 looking in the direction of the arrows.

GENERAL DESCRIPTION

Figures 1, 2, 3:
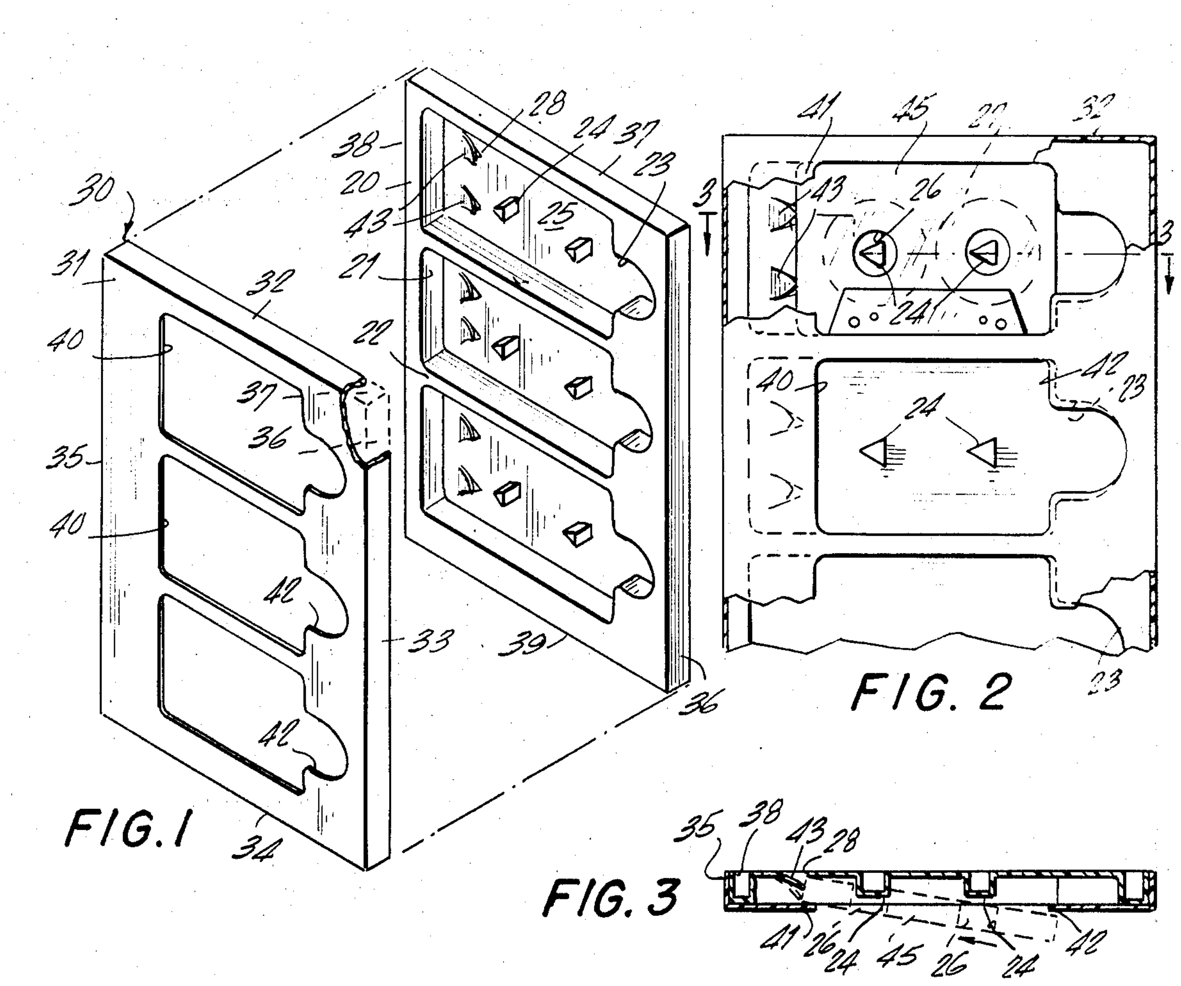
FIG. 1 is a somewhat exploded view of one complete embodiment of the present invention with certain portions broken away for the sake of clarity.
FIG. 2 is a fragmentary view in front elevation of the cassette holder shown in FIG. 1, somewhat enlarged.
FIG. 3 is a cross-sectional view taken on line 3—3 in FIG. 2.

Referring to the drawings and particularly to FIGS. 1–3, 20 indicates a sheet of plastic material such as polyurethrane, nylon, acetate, methyl methacrylate or the like having adequate rigidity to be self supporting and an inherent springiness when fixed. The sheet 20 is vacuum formed or pressed between male and female dies in accordance with well-known techniques to provide a series of cassette receiving cavities 21 separated by walls 22.

Each of the cavities 21 is substantially rectangular in shape and of a size to freely receive a cassette therein. An arcuate recess 23 is provided at one end of each of the cavities 21 to facilitate the removal of a cassette from the cavity.

Upstanding detents 24 are formed in the bottom 25 of each cavity. The detents are of a size and shape which will enable them to loosely slip into the circular opening 26 of the tape reels 27 within the cassettes 45 (see FIG. 2).

Adjacent the end of each cavity 21, opposite the arcuate recess 23, the bottom 25 of the cavity is given two spaced "V" shaped cuts with the apex 28 of the cuts extending in the direction of the center of the cavity. Alternately, a single but larger "V" shaped cut may be made in the cavity 21 as shown at 29 in FIG. 1A. The purpose of the aforesaid "V" shaped cuts will be hereinafter more fully set forth.

A tray shaped member 30 completes the cassette holder and is formed from a single sheet of plastic or paper of suitable rigidity. The tray shaped member comprises a flat panel 31 and side walls 32, 33, 34, 35 extending normal thereto. The area enclosed by the side wall is slightly larger than the cassette receiving sheet 20, the side walls 36–39 of which fit snugly within the side walls 32–35 when the two parts of the cassette holder are broght together as shown in FIGS. 2 and 3.

The flat panel 31 of the tray shaped member is provided with a series of cut outs 40 which generally conform in shape to the cassette receiving cavities 21. However, each of the cut outs 40 are somewhat shorter in length than the cavities 21 so that when the cassette holder is assembled a lip 41, 42 overlies each end of the cavities.

Before assembling the cassette holder shown in FIGS. 1 -3 the "V" shaped tabs 43 formed by the "V" shaped cuts are bent inwardly to the position shown in FIGS. 1, 1A, 2 and 3. It will be seen from an examination of FIG. 3 that the tabs 43 extend into the path of any cassette 28 which may be thrust into the cavity 21.

In order to place a cassette 45 within the assembled holder as shown in FIG. 3, the casette 45 is first slid beneath the lip 41 and pushed against the tabs 43, thereby bending them back until the opposite end of the cassette clears the lip 42. The cassette may then be pressed over the detents 24 and flush with the bottom 25 of the cavity. When the cassette is released the resilient tabs 43 push it beneath the lip 42 thereby securing it in place.

To remove the cassette 45 it is merely necessary to insert a finger into the recess 23 and engage the end of the cassette. The cassette is then urged against the tabs 42 until the end of the cassette may be lifted and slid out of the cavity 21.

Figure 4:
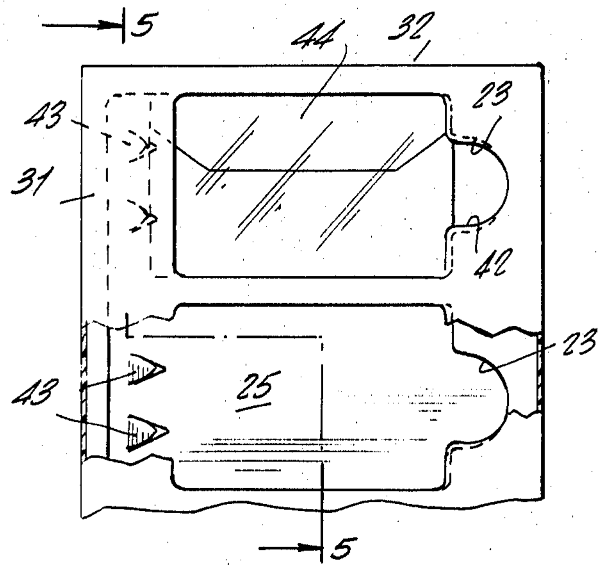
FIG. 4 is a fragmentary view in front elevation of still another embodiment of the present invention.
Figures 1A, 5:
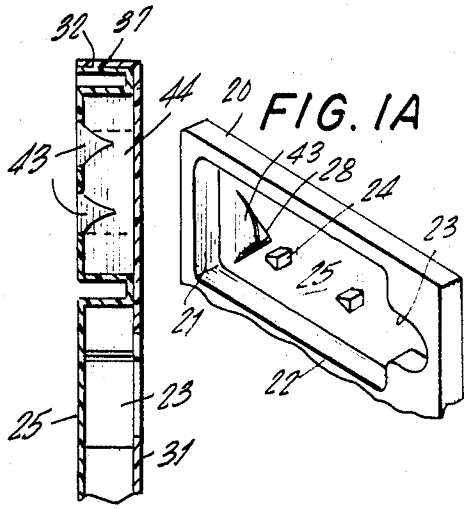
FIG. 1A is a somewhat isometric fragmentary view of a modification of the cassette holder shown in FIG. 1.
FIG. 5 is a cross-sectional view taken on line 5—5 in FIG. 4.

It is within the purview of the present invention to provide a cassette holder which will accommodate both a cassette and the rectangular box 44 in which they are usually sold. Such an embodiment is shown in FIGS. 4 and 5. The cassette holder of FIGS. 4 and 5 differs from that of FIGS. 1 -3 only in the absence of the detents 24 and the dimension of the cavity 21A and the cut outs 40A of the panel 31, both of which must be enlarged to receive the box 44. The operation of the cassette holder of FIGS. 4 and 5 corresponds to that of FIGS. 1 - 3.

Figures 6, 7, 8, 9:
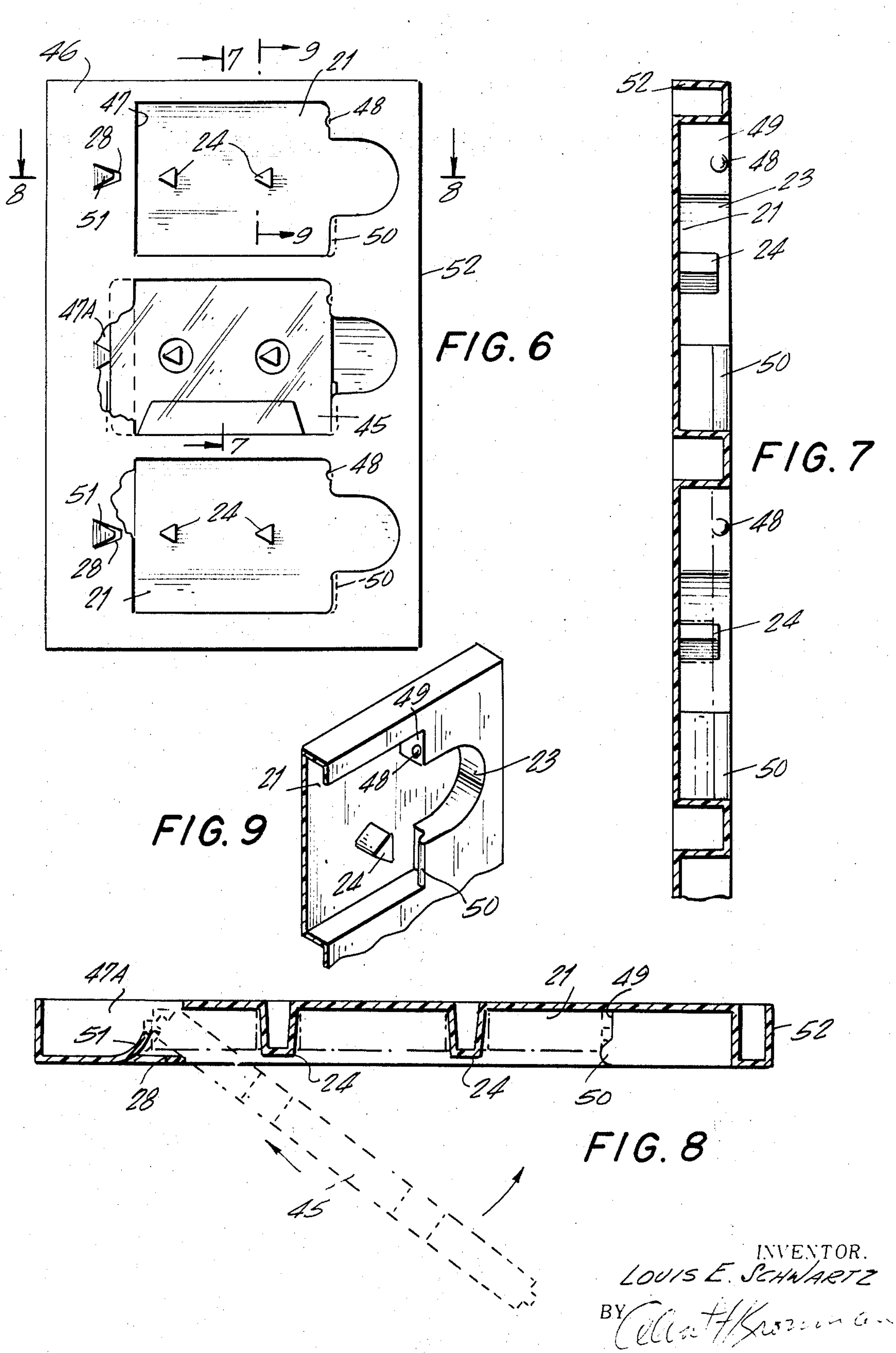
FIG. 6 is a view in front elevation partly broken away of a further embodiment of the present invention.
FIG. 7 is a sectional view taken on line 7—7 in FIG. 6, somewhat enlarged.
FIG. 8 is a sectional view taken on line 8—8 in FIG. 6, somewhat enlarged.
FIG. 9 is a sectional view taken on line 9—9 in FIG. 6, somewhat enlarged.

Referring to FIGS. 6 - 9 there is shown another embodiment of the present invention formed of a single sheet of plastic material. The cavities 21, arcuate recesses 23, and detents 24 are integral with the panel 46 which is the plane of the plastic sheet before forming. In this embodiment the cavity 21 will be open at one end as indicated in FIGS. 6 and 8. A small pip 48 is embossed into the wall 49 of the cavity 21 on one side of the recess 23. The pip 48 is of a size and location to overlie the cassette 45 when it has been placed within the cavity 21. An overhanging lip 50 is formed in the wall 59 to retain the cassette 45 on the side of the recess 23 opposite the pipe 48. Alternately, two pips 48 or two lips 50 on each side of the arcuate recess 23 may be for retaining the cassette within the cavity.

The manner in which the cassette 45 is inserted into and removed from the cavity 21 is shown in dashed lines in FIG. 8 and corresponds to the description set forth above in connection with FIGS. 1 - 3. A "V" shaped tab 51 is formed adjacent one end of each cavity in the panel 45 by means of a "V" shaped cut. The tab 51 is bent inwardly as shown in FIGS. 6 and 8 to lie in the path of the cassette 45. The tab 51 thus yieldingly urges the cassette in the direction of the arcuately recessed wall 49 after it has been inserted into the cavity 21.

The periphery of the cassette holder in this embodiment may be strengthened by a flange 52 integral with the sheet and disposed normal thereto as shwon in FIG. 8.

The manner in which two cassette holders such as those shown in FIGS. 6 - 9 can be combined to form a small album to hold twice as many cassettes is illustrated in FIGS. 10 -12. In this embodiment of the invention the two cassette holders are formed with an outwardly extending peripheral flange 53 by means of which the cassette holders are secured together by glue or bonding. By reason of the positive manner in which the cassettes are retained within the cavities 21 the assembly may be carried about or handled without damage or dislocation of the cassettes.

FIGS. 13 and 14 illustrate still another cassette holder 54 made in accordance with the present invention. The cassette holder 54 is formed of a single sheet of plastic having the same properties of being self supporting and yet resilient as has been hereinabove described. In this embodiment of the invention the plastic sheet is formed into a plurality of cavities 55, each having upstanding detents 24 in the bottoms 56 thereof. One end of the cavities 55 is formed with the arcuate recess 23, and retaining pip 48 and lip 50 described in connection with FIG. 11. The opposite end of the cavities 55 terminates in a sloping wall 57 which connects the bottom 56 of the cavity 55 with the panel face 58 of the holder 54. The wall 57 is slit on three sides as indicated at 59, 60, 61 in FIG. 13, to provide a resilient flap-like structure.

A narrow recess 62 is formed into the plastic sheet parallel to the wall 57 and spaced therefrom (see FIGS. 13 and 14). The recess 62 is not as deep as the cavity 55 and therefore the bottom 63 of the recess 62 is disposed, somewhat above the bottom 56 of the cavity 55. An upstanding wall 64 normal to the plane of the bottom of the recess is disposed nearest the cavity wall 57. The face of the wall 64 is ribbed for a portion of its length at each end thereof as shown at 65 in FIG. 13, to increase its rigidity.

The remaining walls 66, 67 and 68 of the recess 62 slope inwardly from the panel face 58 to the bottom 63 of the recess 62. A narrow slit 69 is cut along the wall 64 where it meets the bottom 63 and walls 66, 68. The wall 64 thus becomes a resilient stop for any cassette which may be inserted into the cavity 56.

In placing a cassette within the cavity 56, the end of the cassette is first brought against the sloping wall 57. Pressure upon the wall 57 by the cassette will force it in the direction of the recess 62 as shown in dashed lines in FIG. 14. The cassette will then slip under the strip 70 of panel face 58 between the cavity 56 and recess 62. As the cassette is urged further, in order to bring the detents 24 into register with the spool openings 26, it comes into contact with the walls 66, 68 of the recess 62 which stop its travel. The wall 57 urges the cassette upwardly against the stop 70 thereby securing it along its top to further prevent it from falling out of the recess.

Having thus fully described the invention, what is claimed as new and desired to be secured by Letters Patents of the United States, is:

1. A tape cassette holder comprising a planar panel of resilient plastic material, at least one cassette receiving cavity underlying the plane of the panel, means at opposed ends of the cavity to overlie and retain the cassette within the cavity, spring means struck from the resilient plastic material and disposed adjacent one end of the cavity to urge the cassette toward the opposite end of the cavity, the cassette receiving cavity being provided with upstanding side walls, a bottom, upstanding cassette receiving detents in the said bottom, a first end wall adjacent the spring means, a second end wall opposite the first end wall and an arcuate recess in the said second end wall.

2. A tape cassette holder according to claim 1 in which the spring means are in the form of at least one tab integral with the bottom of the cassette receiving cavity.

3. A tape cassette holder according to claim 1 in which a tray shaped member having at least one cassette receiving opening therein in substantial registration with the cassette receiving cavity overlies the planar panel and is secured thereto.

4. A tape cassette holder according to claim 2 in which the means to overlie the cassette at one end of the cavity comprises an elongated lip and the means to overlie the cassette at the opposite end of the cavity comprises a lip on each side of the arcuate recess.

5. A tape cassette holder according to claim 2 in which the means to overlie the cassette at one end of the cavity comprises an elongated lip and the means to overlie the cassette at the opposite end of the cavity comprises a pip on one side of the arcuate slot and a lip on the opposite side of said arcuate slot.

6. A tape cassette holder according to claim 2 in which the first end wall is a sloping wall hingedly secured at its bottom to the bottom of the cavity and slit along its top and sides whereby it may yield in a direction away from said cavity under pressure from a cassette and the spring means comprises an elongated recess spaced from but parallel to the said first wall, an upstandng wall in said recess adjacent the first wall of the cavity said recess wall being hingedly secured at its top to the planar panel and slit along its sides and bottom whereby a cassette passing over the yielding first wall will encounter the upstanding recess wall.

7. A tape cassette holder according to claim 6 in which the recess is provided with inwardly sloping walls adjacent the upstanding wall to limit the longitudinal travel of the cassette.

* * * * *